Patented June 17, 1941

2,246,355

UNITED STATES PATENT OFFICE 2,246,355

ANTISERUM

Tillman D. Gerlough, Highland Park, N. J., assignor to E. R. Squibb & Sons, New York, N. Y., a corporation of New York No Drawing. Application March 5, 1938, Serial No. 194,082

4 Claims. (Cl. 167—78)

This invention relates to, and has for its object the provision of, refined and concentrated type-specific antipneumococcic rabbit serum and a method of preparing it.

The efficacy of type-specific antipneumococcic serum in lobar-pneumonia therapy is well recognized in medical practice. Such antiserum has heretofore been prepared from the serum of horses highly immunized against a specific type of pneumococcus; but Horsfall, Goodner, MacLeod, and Harris have recently pointed out (J. A. M. A. 108:1483, May 1, 1937) certain advantages, both theoretical and practical, which antipneumococcic serum prepared from the rabbit possesses over that from the horse. Of these, the most important from the therapeutic point of view are: (1) the smaller size of the antibody molecule in rabbit serum and the consequent deeper penetration of the antibody into the infected tissues; and (2) the greater titer of antibody units obtained in rabbit serum. The intravenous administration of native (i. e., untreated) antipneumococcic rabbit serum, however, results in a high incidence of chills.

In the practice of this invention, the serum of rabbits immunized to a high titer with virulent pneumococci (e. g. type I) is subjected to a special refining and concentrating method to produce a highly-concentrated type-specific antipneumococcic serum which has a relatively low content of inactive protein and is substantially free of chill-producing substances (i. e., is characterized by an extremely low incidence of chills). Since the efficacy of antipneumococcic serum is dependent on the early administration of large amounts of antibody, the increased antibody-concentration made available by the refined and concentrated antipneumococcic rabbit serum of this invention gives rise to an important therapeutic advantage. Another feature as to which the antiserum of this invention obviously enjoys significant superiority is the virtual elimination therefrom of the materials whose presence brings about the distressing reaction of chills.

The procedure of this invention essentially comprises adding a preservative (e. g., phenol, cresol, or sodium ethyl mercurithiosalicylate) to a native antipneumococcic serum (which term, as herein employed, includes plasma), aging the serum at a low temperature, removing the precipitated fatty and proteinaceous material (as by filtering through paper pulp), diluting the soclarified serum with distilled water, heating the diluted serum to about 54–58° C. (to coagulate any fibrin present), removing the precipitate, adding to the serum a sufficient quantity of a saturated solution of a highly-soluble neutral salt (preferably ammonium sulfate) to make the resulting mixture about one-third saturated with the salt, filtering, adding to the filtrate a sufficient quantity of the saturated salt solution to make the mixture about one-half saturated with the salt, separating the precipitated antibody-containing protein, and removing the ammonium sulfate therefrom.

Preferably, the saturated ammonium sulfate solution used in the practice of this invention is prepared by dissolving ammonium sulfate (at 25° C.) in distilled water (free of iron and other heavy metals), adding concentrated ammonia water until the solution has a distinct odor of ammonia, and filtering through hardened filter paper. Preferably also, the distilled water used should be substantially pyrogen-free, and the reagents used should be highly pure.

The following example is illustrative of the invention: 34.9 liters of serum, obtained from rabbits immunized with virulent pneumococcus type I and containing about 2500 Felton mouse units per cc., is preserved with 0.02% of sodium ethyl mercurithiosalicylate and stored at a temperature of 0–5° C. for 2 to 6 weeks; the precipitated fatty and proteinaceous material is filtered off, the clarified serum is diluted with an equal volume of distilled water free of iron and other heavy metals, and heated at 56° C. for about a half hour (any fibrin present, as when plasma is used, being thus coagulated); the resulting precipitate is removed by filtration through paper pulp, and sufficient saturated ammonium sulfate solution is added to make the resulting mixture about 30% saturated with ammonium sulfate; after standing overnight at 0–10° C., the mixture is filtered through hardened filter paper; to the filtrate is added sufficient saturated ammonium sulfate solution to make the mixture about 50% saturated with ammonium sulfate, the precipitated antibody-containing protein is filtered off, and the ammonium sulfate removed therefrom by dialysis. There is obtained 8 liters of refined and concentrated antipneumococcic serum type I, having a potency of about 10,000 Felton mouse units per cc.

The invention may be variously otherwise embodied within the scope of the appended claims.

I claim:

1. The process of refining and concentrating type-specific antipneumococcic rabbit serum which comprises adding a preservative, aging the serum at a low temperature, removing the precipitate, diluting the so-clarified serum with distilled water, heating to about 54-58° C., removing the precipitate, adding to the serum a sufficient quantity of a saturated solution of ammonium sulfate to make the resulting mixture about one-third saturated with the salt, filtering, adding to the filtrate a sufficient quantity of the saturated salt solution to make the mixture about one-half saturated with the salt, separating the precipitated antibody-containing protein, and removing the salt therefrom.

2. The process of refining and concentrating antipneumococcic rabbit serum type I which comprises adding a preservative, aging the serum at a low temperature, removing the precipitate, diluting the so-clarified serum with distilled water, heating to about 54-58° C., removing the precipitate, adding to the serum a sufficient quantity of a saturated solution of ammonium sulfate to make the resulting mixture about one-third saturated with the salt, filtering, adding to the filtrate a sufficient quantity of the saturated salt solution to make the mixture about one-half saturated with the salt, separating the precipitated antibody-containing protein, and removing the salt therefrom.

3. In the process of refining and concentrating type-specific antipneumococcic rabbit serum, the steps of diluting the serum with distilled water, removing the precipitate, adding to such serum a sufficient quantity of a saturated solution of ammonium to make the resulting mixture about one-third saturated with the salt, filtering, adding to the filtrate a sufficient quantity of the saturated salt solution to make the mixture about one-half saturated with the salt, separating the precipitated antibody-containing protein, and removing the salt therefrom.

4. The process of refining and concentrating type-specific antipneumococcic rabbit serum which comprises adding 0.02% of sodium ethyl mercurithiosalicylate, storing the serum at a temperature of 0-5° C. for 2 to 6 weeks, filtering, diluting the filtrate with an equal volume of distilled water, heating at 56° C. for about a half hour, filtering, adding sufficient saturated ammonium sulfate solution to make the resulting mixture about 30% saturated with ammonium sulfate, allowing the mixture to stand at 0-10° C., filtering, adding to the filtrate sufficient saturated ammonium sulfate solution to make the mixture about 50% saturated with ammonium sulfate, filtering, and removing the ammonium sulfate from the precipitate by dialysis.

TILLMAN D. GERLOUGH.

CERTIFICATE OF CORRECTION.

Patent No. 2,246,355. June 17, 1941.

TILLMAN D. GERLOUGH.

It is hereby certified that error appears in the printed specification of the above numbered patent requiring correction as follows: Page 2, second column, line 4, claim 3, after the word "ammonium" insert --sulfate--; and that the said Letters Patent should be read with this correction therein that the same may conform to the record of the case in the Patent Office.

Signed and sealed this 29th day of January, A. D. 1946.

Leslie Frazer (Seal)                         First Assistant Commissioner of Patents